United States Patent
Lefloch (10) Patent No.: US 12,522,339 B1
(45) Date of Patent: Jan. 13, 2026

(54) AIRCRAFT PORTION COMPRISING A DEPRESSURIZATION SAFE EQUIPMENT DOOR

(71) Applicant: DASSAULT AVIATION, Paris (FR)

(72) Inventor: Gregory Lefloch, Little Rock (AR)

(73) Assignee: DASSAULT AVIATION, Paris (FR)

( * ) Notice: Subject to any disclaimer, the term of this patent is extended or adjusted under 35 U.S.C. 154(b) by 0 days.

(21) Appl. No.: 18/769,717

(22) Filed: Jul. 11, 2024

(51) Int. Cl.
| | |
|---|---|
| *B64C 1/14* | (2006.01) |
| *E05C 1/06* | (2006.01) |
| *E05C 7/04* | (2006.01) |
| *E06B 5/12* | (2006.01) |

(52) U.S. Cl.
CPC ............. *B64C 1/1423* (2013.01); *E05C 1/06* (2013.01); *E05C 7/04* (2013.01); *E06B 5/12* (2013.01)

(58) Field of Classification Search
CPC ............ B64C 1/1423; E05C 1/06; E05C 7/04
See application file for complete search history.

(56) References Cited

U.S. PATENT DOCUMENTS

2019/0291843 A1* 9/2019 Smithson ............ E05B 15/0053

\* cited by examiner

*Primary Examiner* — Tye William Abell
(74) *Attorney, Agent, or Firm* — Davidson Kappel LLC (57) ABSTRACT

An aircraft portion includes a piece of equipment including an outer wall delimiting an enclosure and a door facing an aisle. The equipment door is displaceable between a closed configuration and an open configuration. The aisle has a maximum width when the door is in the closed configuration and a minimum width when the door is in the open configuration. When the door is in the closed configuration and in case of depressurization, the door is displaced and kept into an emergency configuration. The aisle has an optimum width which corresponds to a width sufficient for simultaneously letting air escape from the enclosure and enabling passengers to walk down the aisle past the piece of equipment.

20 Claims, 8 Drawing Sheets

AIRCRAFT PORTION COMPRISING A DEPRESSURIZATION SAFE EQUIPMENT DOOR

The present disclosure concerns an aircraft portion of an aircraft comprising:
- a fuselage delimiting an aircraft cabin;
- a piece of equipment delimiting with another piece of equipment or with a wall of the aircraft portion an aisle extending along an aisle axis, the aisle having a width measured according to a transversal axis substantially perpendicular to the aisle axis, the piece of equipment comprising:
  - an outer wall delimiting an enclosure;
  - a door facing the aisle and comprising at least a first leaf and at least a second leaf, each of the at least one first leaf and at least one second leaf being rotatably mounted onto the outer wall respectively along a first axis of rotation and a second axis of rotation, the door being displaceable between:
    - a closed configuration in which the at least one first leaf and the at least one second leaf prevent access to the enclosure by extending both in a plane substantially parallel to the aisle axis and to a vertical axis substantially perpendicular to the aisle axis and to the transversal axis;
    - an open configuration in which the at least one first leaf and the at least one second leaf extend at least partially into the aisle to give access to the enclosure;
  - wherein, by the door, the aisle has:
    - a maximum width when the door is in the closed configuration;
    - a minimum width when the door is in the open configuration.

BACKGROUND

In such an aircraft portion, in case of depressurization (in other words loss of cabin pressurization), the air trapped within the enclosure of the piece of equipment (for example a lavatory) must be evacuated, in particular when the enclosure accounts for a significant volume of air. The evacuation of air from within the enclosure makes it possible to prevent bursting of the outer wall and shattering of parts of the outer wall and/or door.

When the door is in closed configuration and in particular when the door is locked in the closed configuration, the air contained within the enclosure cannot escape. If the difference of pressure is high enough, this can lead to the breaking of the lock and to the displacement of the door in the open configuration. This is not satisfactory since in the open configuration the door extends within the aisle and obstruct the aisle. This may interfere with the egress of the passenger through the aisle.

There is therefore a need for a door system which enhances safety for the passengers in particular in case of depressurization.

SUMMARY

One aim of the present disclosure therefore consists in providing an aircraft portion which enhances passenger safety in particular in case of depressurization.

To that end, the present disclosure provides an aircraft portion of an aircraft comprising:
- a fuselage delimiting an aircraft cabin;
- a piece of equipment delimiting with another piece of equipment or with a wall of the aircraft portion an aisle extending along an aisle axis, the aisle having a width measured according to a transversal axis substantially perpendicular to the aisle axis, the piece of equipment comprising:
  - an outer wall delimiting an enclosure;
  - a door facing the aisle and comprising at least a first leaf and at least a second leaf, each of the at least one first leaf and at least one second leaf being rotatably mounted onto the outer wall respectively along a first axis of rotation and a second axis of rotation, the door being displaceable between:
    - a closed configuration in which the at least one first leaf and the at least one second leaf prevent access to the enclosure by extending both in a plane substantially parallel to the aisle axis and to a vertical axis substantially perpendicular to the aisle axis and to the transversal axis;
    - an open configuration in which the at least one first leaf and the at least one second leaf extend at least partially into the aisle to give access to the enclosure;
  - wherein, by the door, the aisle has:
    - a maximum width when the door is in the closed configuration;
    - a minimum width when the door is in the open configuration; and
  - wherein, when the door is in the closed configuration and in case of depressurization, the door is displaced and kept into an emergency configuration which is between the closed configuration and the open configuration, wherein by the door, the aisle has an optimum width which is between the maximum width and the minimum width and which corresponds to a width sufficient for simultaneously:
    - letting air escape from the enclosure; and
    - enabling passengers to walk down the aisle past the piece of equipment.

Thanks to the present disclosure, when the door is in the closed configuration and in case of depressurization, the door is opened enough to let the air trapped within the enclosure of the piece of equipment escape while encroaching as less as possible on the aisle. This makes it possible to allow balancing of the pressure between the inside and the outside of the enclosure while disturbing as less as possible the egress of passengers through the aisle.

The aircraft portion according to the present disclosure may comprise one or more of the following features, considered alone or according to any technically possible combination:
- the piece of equipment further comprises a locking system comprising a door striker mounted onto the at least one first leaf and a dead bolt mounted onto the at least one second leaf,
- wherein the dead bolt is movable in translation along a lock axis, which is substantially parallel to the aisle axis when the door is in the closed configuration, between:
  - a locking position wherein, when the door is in the closed configuration, the dead bolt cooperates with the door striker to keep the door in the closed configuration;
  - an unlocking position wherein, when the door is in the closed configuration, the dead bolt is away from the door striker so as to enable a displacement of the door from the closed configuration to the open configuration;

the dead bolt comprising:
  a first portion designed to extend within the door striker in the locking position;
  a second portion mounted onto the at least one second leaf; and
  an articulation mechanism connecting the first portion and the second portion of the dead bolt and extending between the at least one first leaf and the at least one second leaf when the door is in the closed configuration, the articulation mechanism comprising a joint enabling movement of the first portion relative to the second portion along a rotation axis substantially parallel to the vertical axis;
wherein, when the door is in the closed configuration, when the dead bolt is in the locking position and in case of depressurization, the door is displaced into the emergency configuration by rotation of the first portion of the dead bolt relative to the second portion of the dead bolt around the rotation axis of the joint;
  the joint is a pin joint comprising a pin extending substantially parallel to the vertical axis;
  the articulation mechanism further comprises a mechanical fuse designed to:
prevent rotation of the first portion of dead bolt relative to the second portion of dead bolt via the joint under normal conditions of flight;
break in case of depressurization, the breaking of the mechanical fuse enabling rotation of the first portion of dead bolt relative to the second portion of dead bolt via the joint;
  in case of depressurization, the mechanical fuse is designed to break under a pressure load which is higher than or equal to a load threshold,
wherein the load threshold is lower than or equal to the load generated by the depressurization onto the door, and wherein the mechanical fuse is designed to remain whole under loads that are lower than the load threshold;
  the load threshold is between 550 N and 750 N;
  the mechanical fuse is a fuse pin extending substantially parallel to the rotation axis of the joint, and wherein in case of depressurization, the fuse pin breaks under shear stress;
  a shear stress threshold corresponding to the load threshold is between 250 MPa and 500 MPa;
  the fuse pin and the joint are separated in a plane substantially perpendicular to the rotation axis of the joint, by a distance between 10 mm and 15 mm;
  the fuse pin is made up of an aluminum alloy, and wherein the fuse pin has a diameter between 0.125 inch and 0.5 inch;
  the articulation mechanism further comprises a stop and a complementary stop designed to cooperate to limit the rotation of the first portion of the dead bolt relative to the second portion of the dead bolt via the joint to a maximum rotation in which the door is in the emergency configuration;
  the door striker comprises a housing designed to receive the first portion of the dead bolt in the locking position, the dead bolt comprising at least one bearing designed to cooperate with inner walls of the housing during the displacement of the dead bolt between the locking and unlocking positions to guide the movement of the dead bolt;
  the at least one bearing is a ball bearing;
  the dead bolt comprises at least two bearings arranged next to one another along the lock axis;
  the aircraft portion is such that:
    the minimum width of the aisle by the door is between 4 inches and 8 inches;
    the optimum width of the aisle by the door is between 15 inches and 25 inches;
  the aircraft portion is such that:
  in the open configuration of the door, each of the at least one first leaf and at least one second leaf forms an angle between 75° and 100° with the aisle axis;
  in the emergency configuration of the door, each of the at least one first leaf and at least one second leaf forms an angle between 5° and 15° with the aisle axis;
    the aircraft cabin extends along a longitudinal axis of the aircraft, the piece of equipment being arranged into a lateral part of the aircraft cabin, the aisle axis being substantially parallel to the longitudinal axis of the aircraft;
    the piece of equipment is an aircraft lavatory;
    the piece of equipment delimits the aisle with a partition wall of the aircraft portion, the partition wall extending substantially perpendicular to the aisle axis in a perpendicular plane, the partition wall of the aircraft portion comprising an edge delimiting the aisle with the piece of equipment,
  wherein the first axis of rotation or the second axis of rotation of the leaves extends into the perpendicular plane,
  wherein the aisle has a passageway span being the minimum distance between:
    the edge of the partition wall; and
    the at least one first leaf or the at least one second leaf;
  the passageway span being:
    between 4 inches and 8 inches in the open configuration of the door;
    between 18 inches and 22 inches in the emergency configuration of the door.

The present disclosure also concerns an aircraft comprising an aircraft portion as described above.

BRIEF SUMMARY OF THE DRAWINGS

The present disclosure will be better understood upon reading the following description, provided solely as an example, and done in reference to the appended drawings, in which.

DETAILED DESCRIPTION

Figure 1:
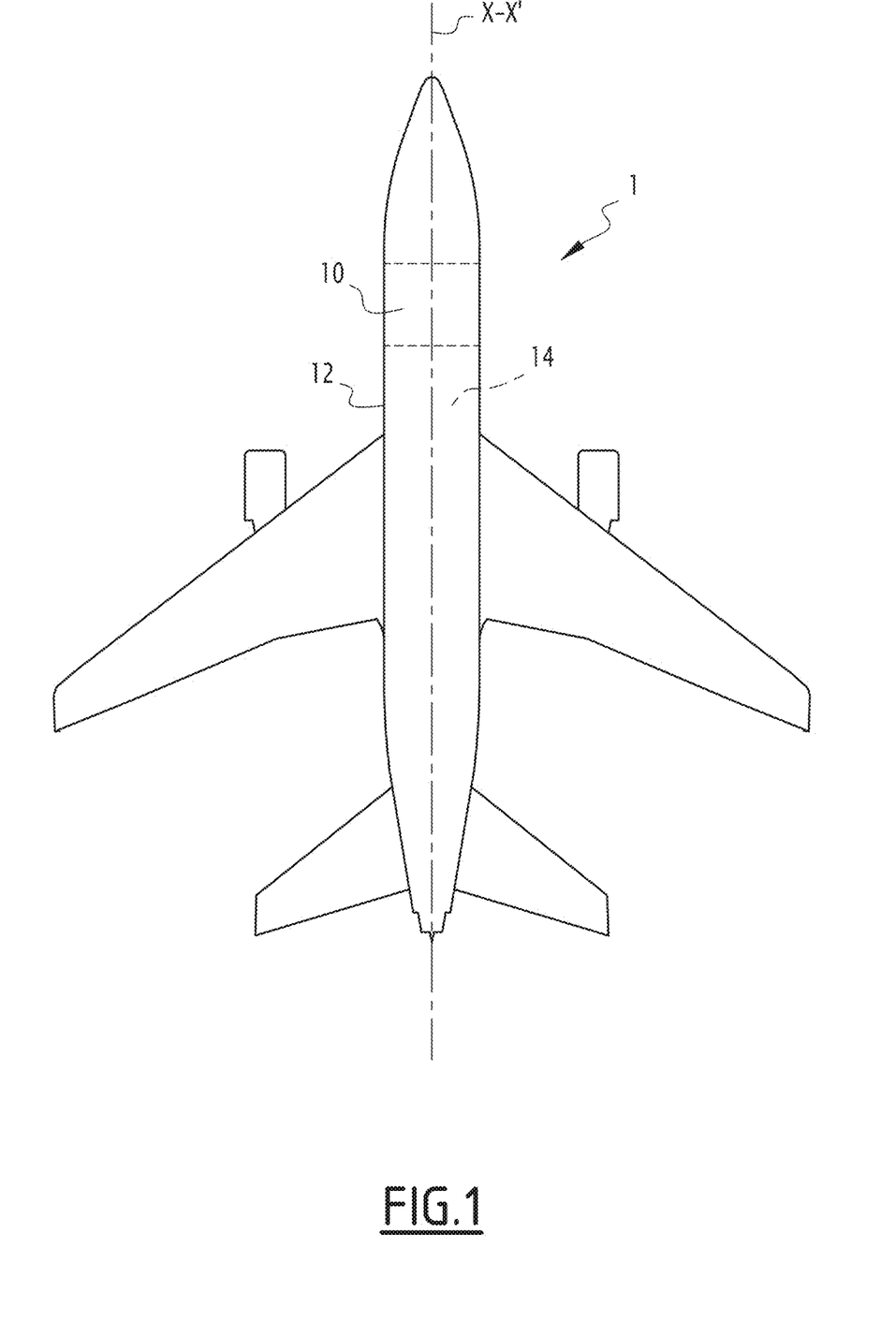
FIG. 1 is a schematic illustration of an aircraft according to the present disclosure.

FIG. 1 shows an aircraft 1 according to the present disclosure.

FIGS. 2 to 8 show a portion 10 of the aircraft 1, according to the present disclosure.

The aircraft portion 10 comprises a fuselage 12, a piece of equipment 20 and another piece of equipment 88. In the following the piece of equipment 20 will be called the first piece of equipment 20 and the other piece of equipment 88 will be called the second piece of equipment 88.

The fuselage 12 delimits an aircraft cabin 14.

Advantageously, the aircraft cabin 14 extends along a longitudinal axis X-X' of the aircraft 1.

The first piece of equipment 20 delimits with the second piece of equipment 88 or with a wall 16 of the aircraft portion 10 an aisle 36 extending along an aisle axis A-A'.

For example, the first piece of equipment 20 is an aircraft lavatory. Advantageously, the aircraft lavatory comprises within an enclosure 24 of the first piece of equipment 20 a toilet and/or a sink and/or any other furniture classically used in an aircraft lavatory.

The first piece of equipment 20 comprises an outer wall 22 and a door 28.

Advantageously, the first piece of equipment 20 further comprises a locking system 40.

Advantageously again, the first piece of equipment 20 is arranged into a lateral part 15 of the aircraft cabin 14, for example against the fuselage 12 of the aircraft portion 10.

The outer wall 22 delimits the enclosure 24.

The door 28 faces the aisle 36.

The door 28 comprises at least a first leaf 30 and at least a second leaf 32. In the following, a door 28 comprising a single first leaf 30 and a single second leaf 32 is described. Of course, the present disclosure also concerns aircraft portions 10 wherein the door 28 has several first leaves 30 and/or several second leaves 32.

The door 28 is displaceable between:
  a closed configuration (FIG. 2) in which the first leaf 30 and the second leaf 32 prevent access to the enclosure 24 by extending both in a plane DP substantially parallel to the aisle axis A-A' and to a vertical axis Z-Z' substantially perpendicular to the aisle axis A-A' and to a transversal axis Y-Y' (which is also substantially perpendicular to the aisle axis A-A');
  an open configuration (FIGS. 3 and 8) in which the first leaf 30 and the second leaf 32 extend at least partially into the aisle 36 to give access to the enclosure 24.

The door 28 is further displaceable into an emergency configuration (FIG. 4 and also in dotted lines in FIG. 8) which is between the closed configuration and the open configuration.

In particular, when the door 28 is in the closed configuration and in case of depressurization, the door 28 is displaced, especially from the closed configuration to the emergency configuration, and kept into the emergency configuration.

Advantageously, in the closed configuration, the door 28 and the outer wall 22 are substantially airtight such that substantially no air exits the enclosure 24 through the door 28 and/or outer wall 22.

The first leaf 30 is rotatably mounted onto the outer wall 22 along a first axis of rotation R1, which in particular is substantially parallel to the vertical axis Z-Z'.

The second leaf 32 is rotatably mounted onto the outer wall 22 along a second axis of rotation R2, which is advantageously substantially parallel to the first axis of rotation R1.

For example, both the first axis of rotation R1 and the second axis of rotation R2 extend substantially in the plane DP.

For example, in the open configuration of the door 28 (FIG. 3), each of the first leaf 30 and the second leaf 32 forms an angle A1 between 75° and 100°, in particular substantially equal to 90°, with the aisle axis A-A'.

For example, in the emergency configuration of the door 28 (FIG. 4), each of the first leaf 30 and the second leaf 32 forms an angle A2 between 5° and 15°, in particular substantially equal to 11°, with the aisle axis A-A'.

For example, the first axis of rotation R1 and the second axis of rotation R2 are separated by a distance D1 measured according to the aisle axis A-A' between 25 inches and 35 inches, preferably substantially equal to 30 inches.

The aisle 36 has a width W measured according to the transversal axis Y-Y' substantially perpendicular to the aisle axis A-A'.

Advantageously, the aisle axis A-A' is substantially parallel to the longitudinal axis X-X' of the aircraft 1.

Figure 2:
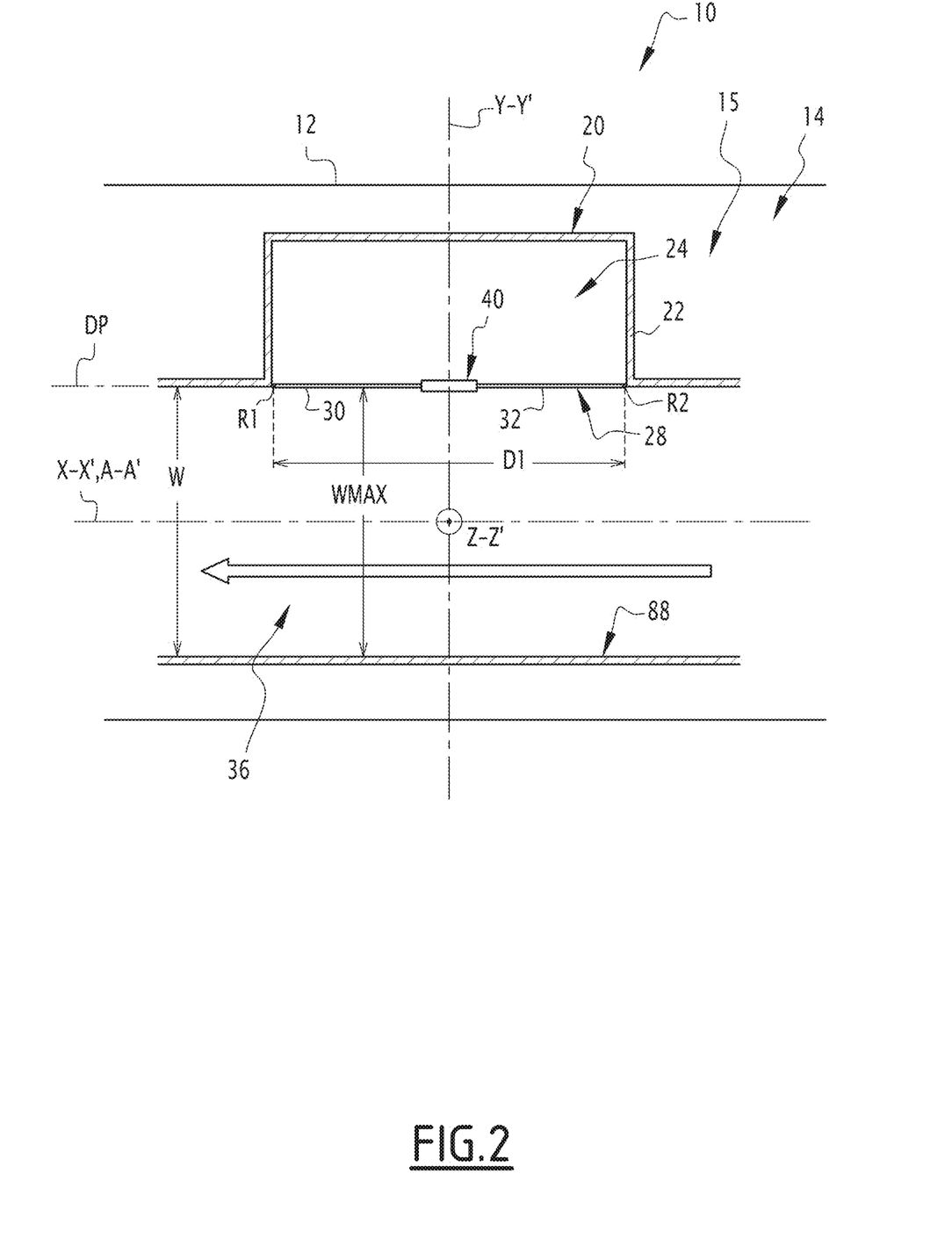
FIG. 2 is a top view of an aircraft portion according to the present disclosure and being part of the aircraft of FIG. 1, the door being in the closed configuration.
Figure 3:
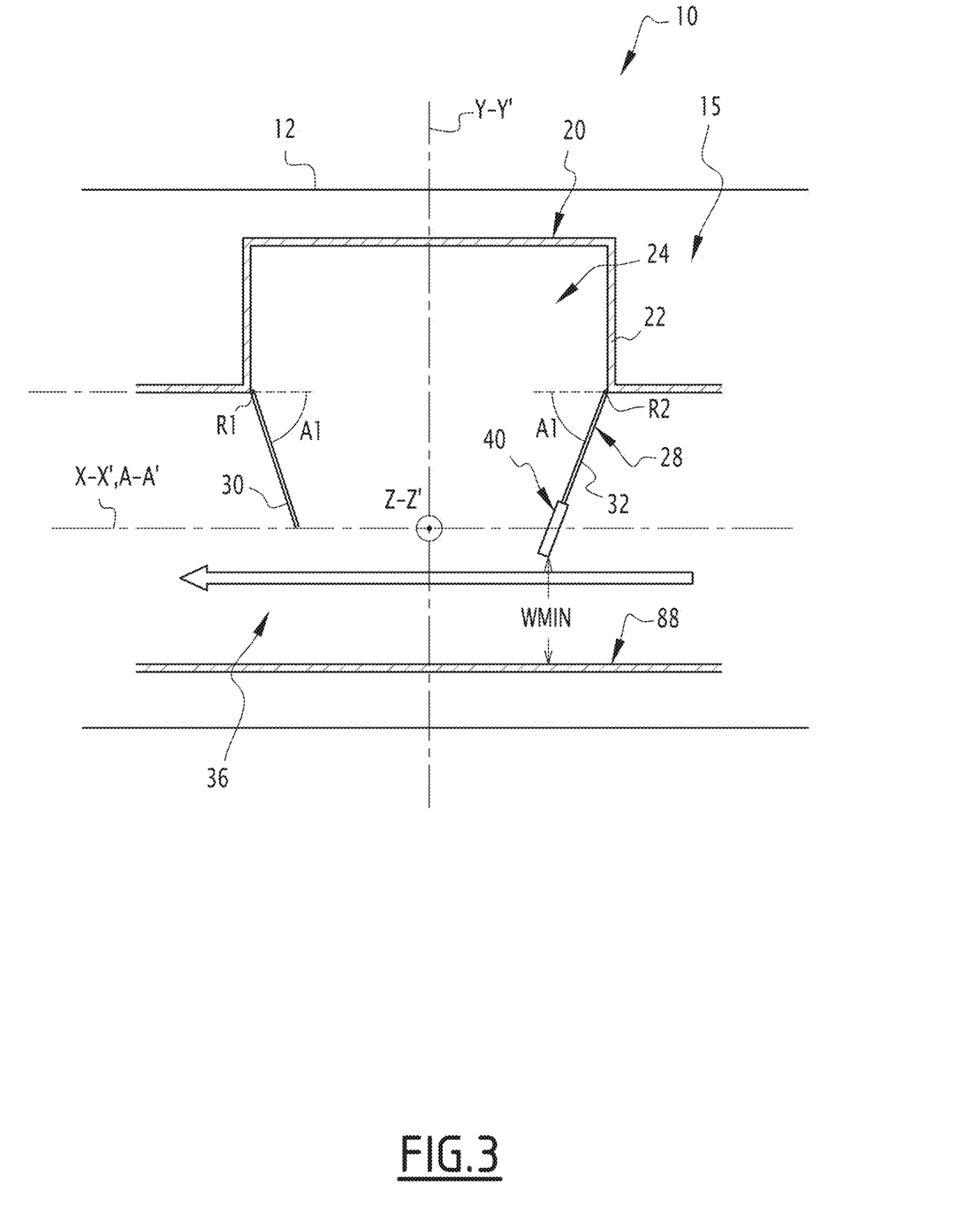
FIG. 3 is a schematic illustration of a top view of the aircraft portion of FIG. 2, the door being in the open configuration.
Figure 4:
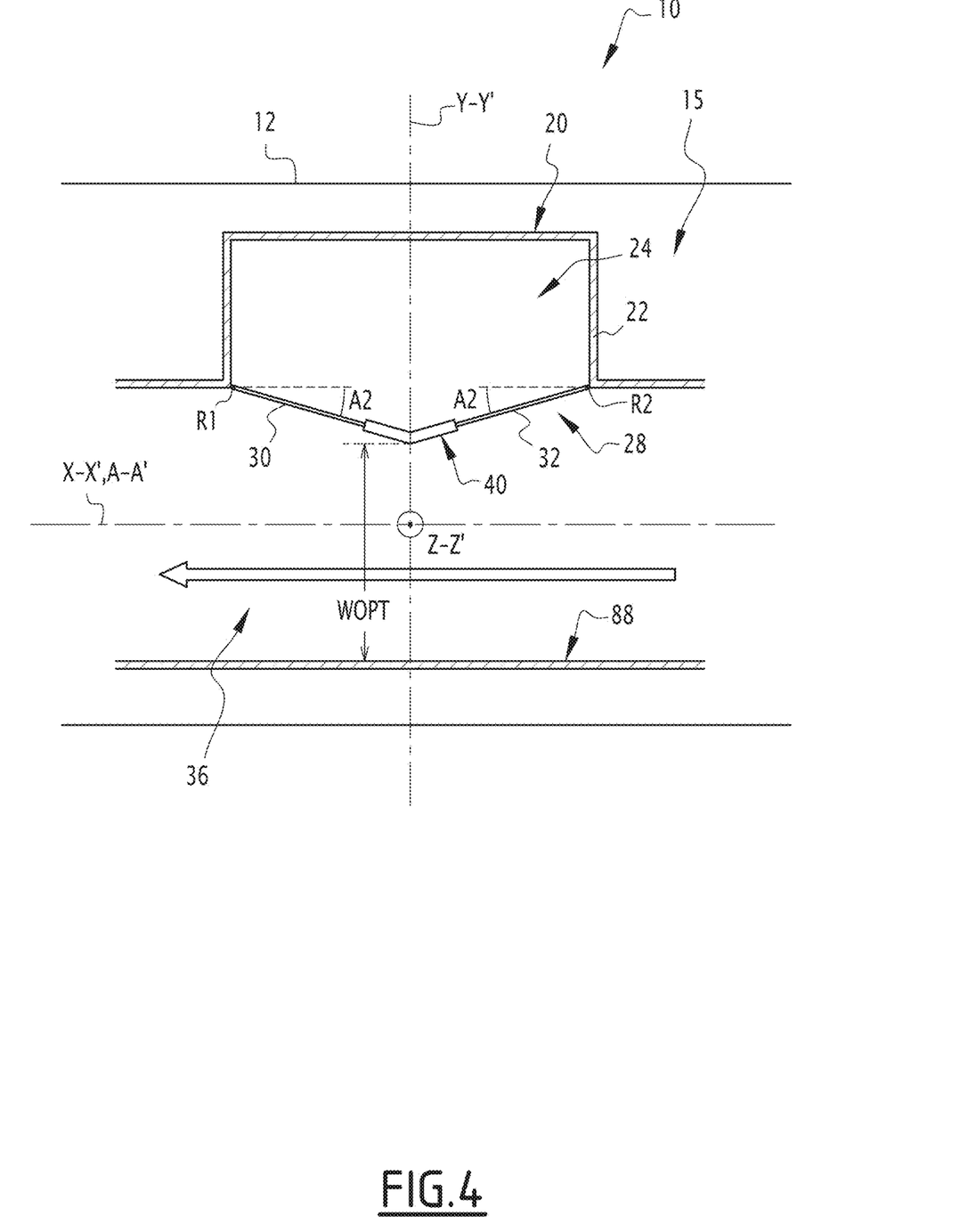
FIG. 4 is a schematic illustration of a top view of the aircraft portion of FIG. 2, the door being in the emergency configuration.

By the door 28, the aisle 36 has:
  a maximum width WMAX when the door 28 is in the closed configuration (FIG. 2);
  a minimum width WMIN when the door 28 is in the open configuration (FIG. 3); and
  an optimum width WOPT when the door 28 is in the emergency configuration (FIG. 4).

The optimum width WOPT is between the maximum width WMAX and the minimum width WMIN and corresponds to a width W sufficient for simultaneously:
  letting air escape from the enclosure 24; and
  enabling passengers to walk down the aisle 36 past the first piece of equipment 20.

For example, the minimum width WMIN of the aisle 36 by the door 28 is between 4 inches and 8 inches.

For example, the optimum width WOPT of the aisle 36 by the door 28 is between 15 inches and 25 inches.

The locking system 40 comprises a door striker 42 and a dead bolt 50.

Figure 5:
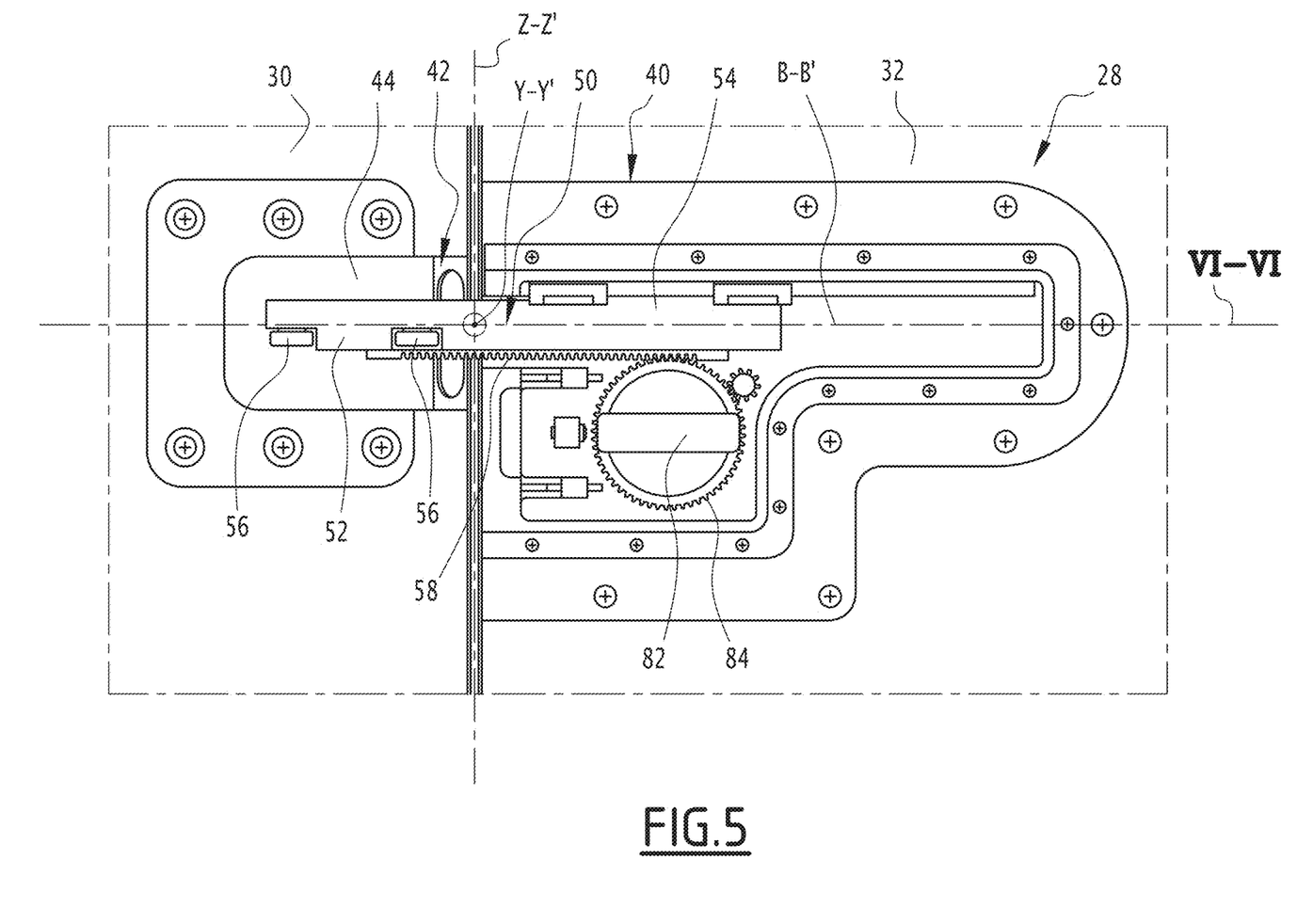
FIG. 5 is a schematic illustration of a side view of a locking system of the piece of equipment of the aircraft portion of FIG. 2.

Advantageously, as shown on FIG. 5, the locking system 40 further comprises a knob 82.

The door striker 42 is mounted onto the first leaf 30.

Advantageously, the door striker 42 comprises a housing 44.

The housing 44 is designed to receive a first portion 52 of the dead bolt 50 in a locking position of the dead bolt 50.

The dead bolt 50 is mounted onto the second leaf 32.

In view of FIG. 5, the dead bolt 50 is movable in translation along a lock axis B-B' between the locking position (shown in FIGS. 2, 5 and 6) and an unlocking position (FIG. 3).

Advantageously, the lock axis B-B' is substantially parallel to the aisle axis A-A' when the door 28 is in the closed configuration, as shown on FIG. 2.

When the door 28 is in the closed configuration and when the dead bolt 50 is in the locking position (FIGS. 2, 5 and 6), the dead bolt 50 cooperates with the door striker 42 to keep the door 28 in the closed configuration, in particular by simultaneously preventing rotation of the first leaf 30 around the first axis of rotation R1 and of the second leaf 32 around the second axis of rotation R2.

When the door 28 is in the closed configuration and when the dead bolt 50 is in the unlocking position, the dead bolt 50 is away from the door striker 42 so as to enable a displacement of the door 28 from the closed configuration to the open configuration.

Advantageously, as shown on FIG. 5, the dead bolt 50 further comprises a rack surface 58.

Figure 6:
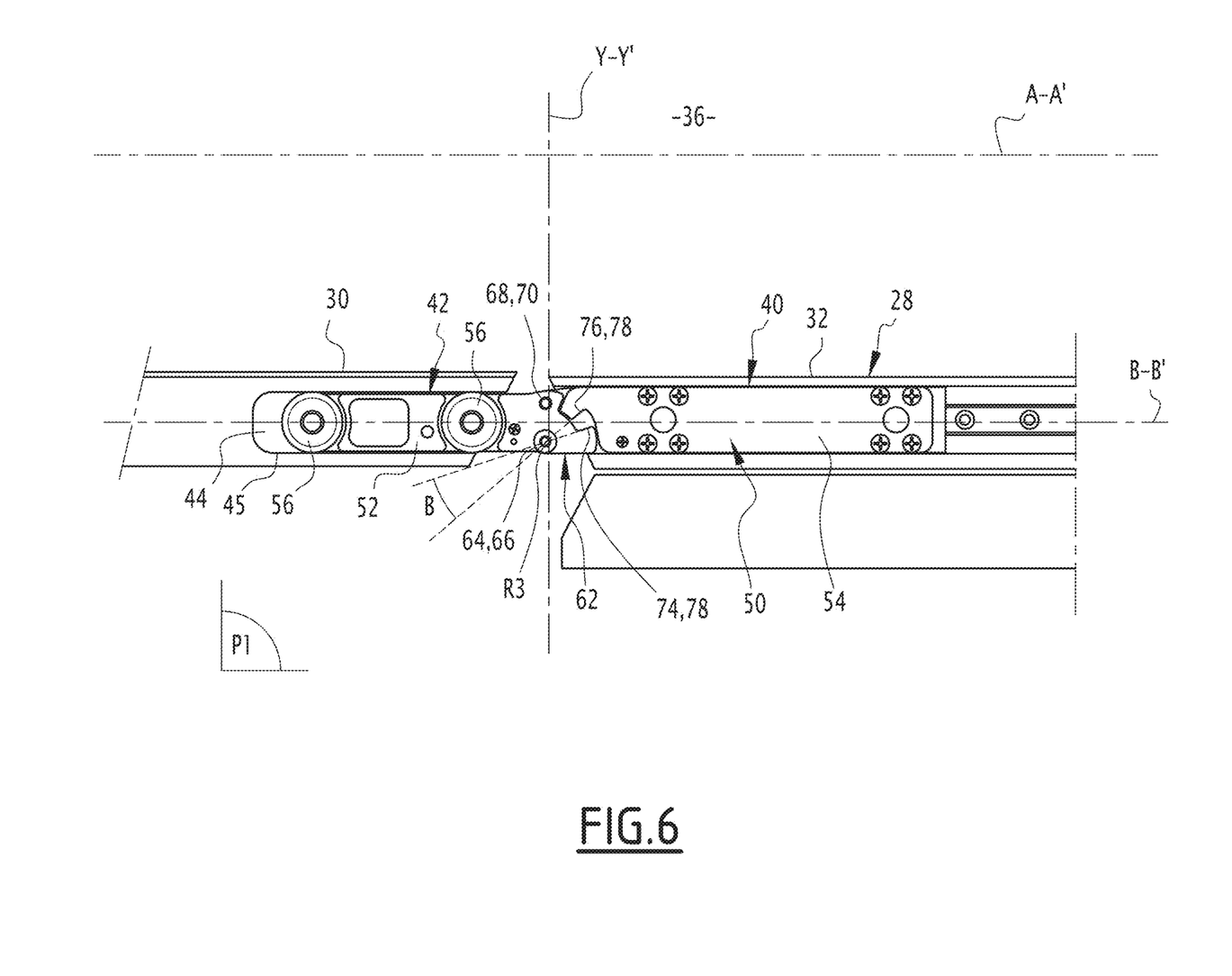
FIG. 6 is a schematic illustration of a cross section of the locking system of FIG. 5 according to the section plane VI-VI, the door being in the closed configuration and the dead bolt of the locking system being in the locking position.
Figure 7:
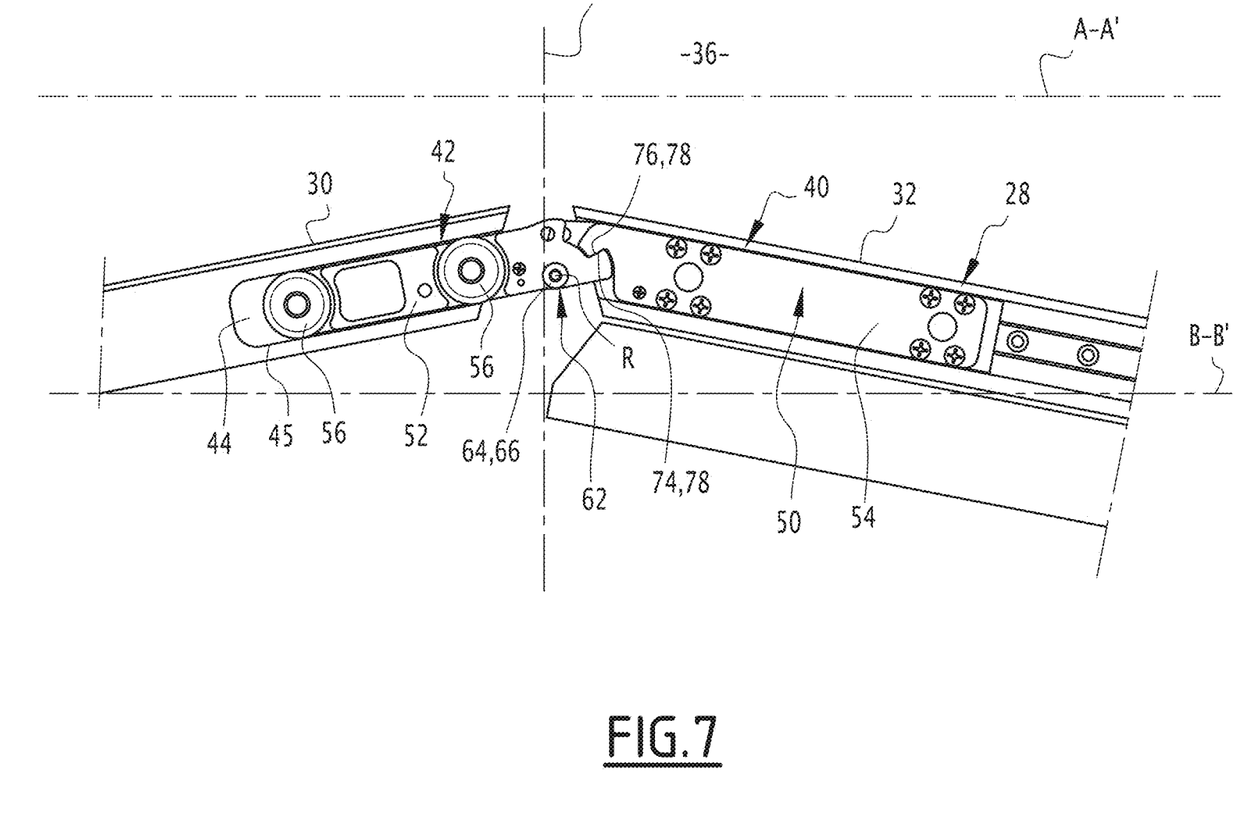
FIG. 7 is a schematic illustration of a cross section of the locking system of FIG. 5 according to the same section plane as for FIG. 6, the door being in the emergency configuration.

In view of FIGS. 5 to 7, the dead bolt 50 comprises the first portion 52, a second portion 54 and an articulation mechanism 62.

The first portion 52 is designed to extend within the door striker 42, in particular within the housing 44, in the locking position.

The second portion 54 is mounted onto the second leaf 32.

Advantageously, the dead bolt 50 comprises at least one bearing 56 designed to cooperate with inner walls 45 of the housing 44 of the door striker 42 during displacement of the dead bolt 50 between the locking and unlocking positions to guide the movement of the dead bolt 50, in particular of the first portion 52 of the dead bolt 50.

In particular, the dead bolt 50 comprises at least two bearings 56 (for example exactly two bearings 56 in the example of FIGS. 5 to 7) arranged next to one another along the lock axis B-B'.

Advantageously, the at least one bearing 56 is a ball bearing.

Advantageously again, the at least one bearing 56 is designed to cooperate with the inner walls 45 of the housing 44 of the door striker 42 when the door 28 is displaced from the closed configuration to the emergency configuration. As shown on FIG. 7, when the door 28 has been displaced from the closed configuration to the emergency configuration, the first portion 52 of the dead bolt 50 has moved at least partially out of the housing 44 of the door striker 42 but comprises at least a part remaining in said housing 44. In particular, the part of the first portion 52 of the dead bolt 50 remaining within the housing 44 bears the at least one bearing 56.

For example, as shown on FIG. 5, the first portion 52 and/or the second portion 54 bears the rack surface 58.

The articulation mechanism 62 connects the first portion 52 and the second portion 54 of the dead bolt 50.

The articulation mechanism 62 extends between the first leaf 30 and the second leaf 32 when the door 28 is in the closed configuration, and especially also when the door 28 is in the emergency configuration.

Advantageously, when the door 28 is in the closed configuration the first portion 52, the articulation mechanism 62 and the second portion 54 are successively arranged in line along the lock axis B-B'.

The articulation mechanism 62 comprises a joint 64.

Advantageously, the articulation mechanism 62 further comprises a mechanical fuse 68.

Advantageously again, the articulation mechanism 62 further comprises a stop 74 and a complementary stop 76.

The joint 64 enables movement of the first portion 52 of the dead bolt 50 relative to the second portion 54 of the dead bolt 50 around a rotation axis R3 substantially parallel to the vertical axis Z-Z'.

When the door 28 is in the closed configuration, when the dead bolt 50 is in the locking position and in case of depressurization, the door 28 is displaced into the emergency configuration by rotation of the first portion 52 of the dead bolt 50 relative to the second portion 54 of the dead bolt 50 around the rotation axis R3 (as shown in FIG. 7).

Advantageously, the joint 64 is a pin joint comprising a pin 66 extending substantially parallel to the vertical axis Z-Z', in particular through the first portion 52 and the second portion 54 of the dead bolt 50.

The mechanical fuse 68 is designed to:
prevent rotation of the first portion 52 of the dead bolt 50 relative to the second portion 54 of the dead bolt 50 via the joint 64 under normal conditions of flight (in particular under normal cabin pressurization, wherein the pressure difference between the enclosure 24 and the aisle 36 is low);
break in case of depressurization, the breaking of the mechanical fuse 68 enabling rotation of the first portion 52 of the dead bolt 50 relative to the second portion 54 of the dead bolt 50 via the joint 64. The rotation of the first portion 52 of the dead bolt 50 relative to the second portion 54 of the dead bolt 50 via the joint 64 enables rotation of the first leaf 30 relative to the first axis of rotation R1 and of the second leaf 32 relative to the second axis of rotation R2, at least until the door reaches the emergency configuration.

In particular, in case of depressurization, the mechanical fuse 68 is designed to break under a pressure load which is higher than or equal to a load threshold.

Advantageously, the load threshold is lower than or equal to the load generated by the depressurization onto the door 28.

Advantageously again, the mechanical fuse 68 is designed to remain whole under loads that are lower than the load threshold.

In particular, the load threshold is chosen so that typical loads that can be applied to the door 28 during normal conditions of flight do not lead to breaking of the mechanical fuse 68. For example, the load threshold is chosen so that the load generated by a passenger leaning onto the door 28 or pushing the door 28 when the door 28 is in the closed configuration and when the dead bolt 50 is in the locking position, does not lead to breaking of the mechanical fuse 68.

For example, the load threshold is between 550 N and 750 N, for example substantially equal to 668.5 N.

Advantageously, the mechanical fuse 68 is a fuse pin 70 extending substantially parallel to the rotation axis R3 of the joint 64. In particular, the fuse pin 70 and the pin 66 of the joint 64 are substantially parallel. Advantageously, the fuse pin 70 and the pin 66 extend in a plane which is substantially perpendicular to the aisle axis A-A'.

Advantageously again, the fuse pin 70 extends through the first portion 52 and the second portion 54 of the dead bolt 50.

In case of depressurization, the fuse pin 70 breaks under shear stress. In particular said shear stress derives from the rotational constraint applied onto the joint 64 by the pressure load applied onto the door 28 and onto the dead bolt 50 due to the depressurization.

For example, a shear stress threshold corresponding to the load threshold is between 250 MPa and 500 MPa, for example substantially equal to 341.4 MPa.

For example, as shown on FIG. 6, in a plane P1 substantially perpendicular to the rotation axis R3 of the joint 64, the fuse pin 70 and the joint 64 (in particular the pin 66 of the joint 64) are separated by a distance D2 between 10 mm and 15 mm, for example substantially equal to 12 mm.

Advantageously, the fuse pin 70 is made up of an aluminum alloy.

Advantageously again, the fuse pin 70 has a diameter between 0.125 inch and 0.5 inch, for example substantially equal to 0.138 inch.

The stop 74 and the complementary stop 76 of the articulation mechanism 62 are designed to cooperate to limit the rotation of the first portion 52 of the dead bolt 50 relative to the second portion 54 of the dead bolt 50 via the joint 64 to a maximum rotation (shown on FIG. 7) in which the door 28 is in the emergency configuration.

In particular, the cooperation of the stop 74 and of the complementary stop 76 prevents the door 28 from passing from the emergency configuration to the open configuration.

In the example of FIGS. 6 and 7, the stop 74 is defined by the first portion 52 of the dead bolt 50 and the complementary stop 76 is defined by the second portion 54 of the dead bolt 50.

In particular, each of the stop 74 and complementary stop 76 are surfaces 78 extending in planes that comprise the axis of rotation R3 of the joint 64.

When the door 28 is in the closed configuration, the planes of the surfaces 78 are separated by an angle B (FIG. 6) which corresponds to the angle of maximum rotation of the first portion 52 of the dead bolt 50 relative to the second portion 54 of the dead bolt 50.

Advantageously, when the door 28 is in the emergency configuration, the cooperation of the stop 74 with the complementary stop 76 and the extension of the first portion 52 of dead bolt 50 within the housing 44 of the door striker 42 prevents the door 28 from moving further toward the open configuration.

With reference to FIG. 5, the knob 82 of the locking system 40 comprises a pinion surface 84 designed to cooperate with the rack surface 58 of the dead bolt 50 to move the dead bolt 50 between the locking position and the unlocking position.

In particular, the knob 82 is designed to be rotated by a user, in particular a user standing in the aisle 36, to move the dead bolt 50 between the locking and unlocking positions. For example, when the enclosure 24 is designed to accommodate passengers, in particular in the case wherein the first piece of equipment 20 is a lavatory, the first piece of equipment 20 comprises another locking system (not shown) designed to be used by a user standing within the enclosure 24 to lock or unlock the door 28.

The second piece of equipment 88 is for example a furniture arranged within the aircraft cabin 14, a storage room, a bed room, etc.

Figure 8:
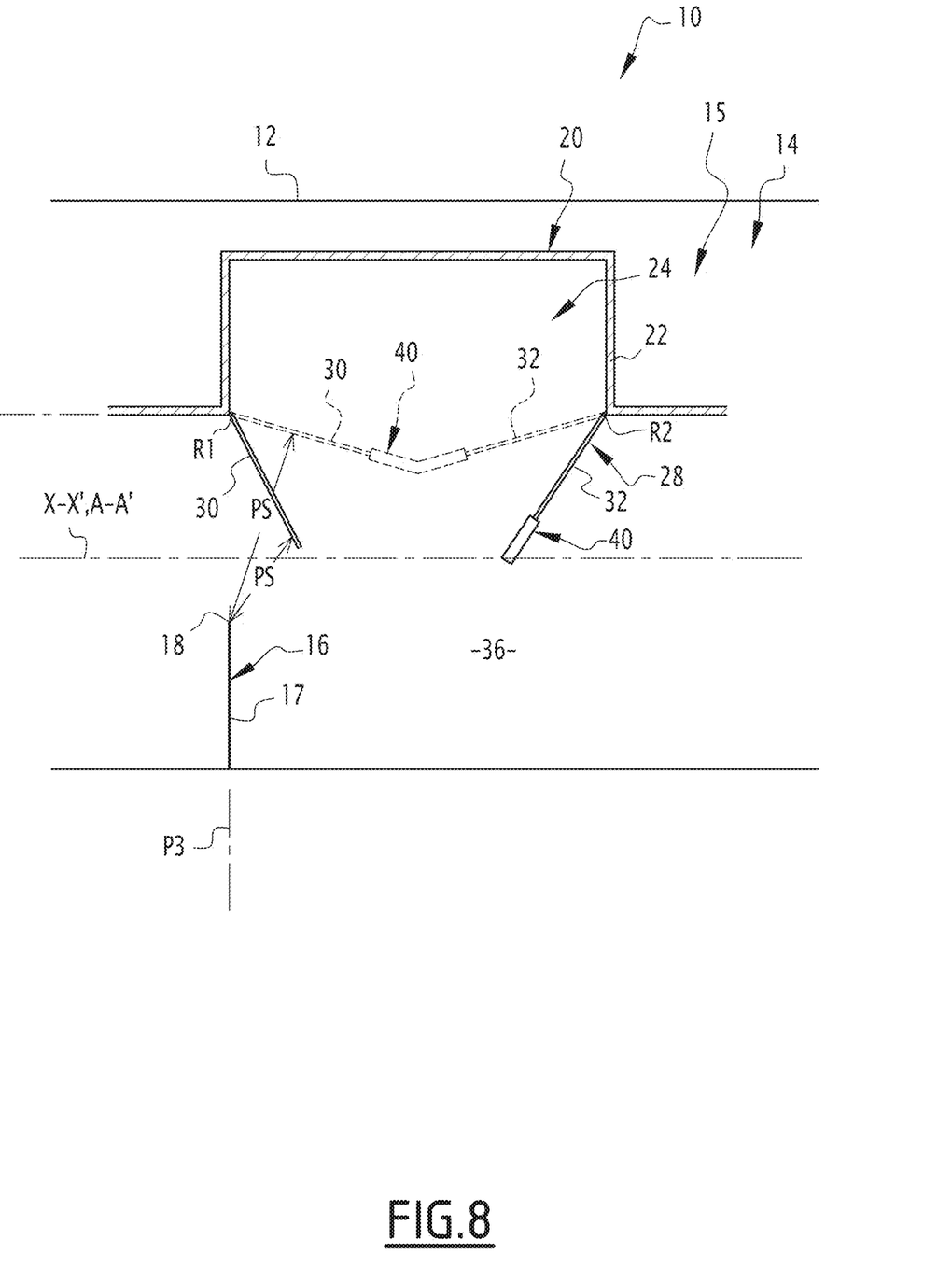
FIG. 8 is a schematic illustration of a top view of an aircraft portion according to the present disclosure and being part of the aircraft of FIG. 1, wherein the door is in the open configuration and wherein the aisle is delimited by the piece of equipment and a partition wall of the aircraft portion.

In the example of FIG. 8, the first piece of equipment 20 delimits the aisle 36 with a partition wall 17 (which is a wall 16) of the aircraft portion 10.

The partition wall 17 of the aircraft portion 10 extends substantially perpendicular to the aisle axis A-A', in particular to the longitudinal axis X-X' of the aircraft 1, in a perpendicular plane P3.

The partition wall 17 of the aircraft portion 10 comprises an edge 18 delimiting the aisle 36 with the first piece of equipment 20.

For example, as shown on FIG. 8, the first axis of rotation R1 or the second axis of rotation R2 of the leaves 30, 32 extends into the perpendicular plane P3. On the specific example of FIG. 8, the first axis of rotation R1 extends into the perpendicular plane P3.

For example, the aisle 36 has a passageway span PS which corresponds to the minimum distance between:
the edge 18 of the partition wall 17; and
the first leaf 30 or the second leaf 32.

For example, the passageway span PS is:

between 4 inches and 8 inches, in particular substantially equal to 6 inches, in the open configuration of the door 28 (in solid lines on FIG. 8); and between 18 inches and 22 inches, especially substantially equal to 20 inches, in the emergency configuration of the door 28 (in dotted lines on FIG. 8).

In the example of FIG. 8, the width W of the aisle 36 is measured in the perpendicular plane P3 from a projection of the door leaves 30, 32 onto the perpendicular plane P3. In other terms, in the example of FIG. 8, the width W of the aisle 36 is the smallest distance in the perpendicular plane P3 between the edge 18 of the partition wall 17 and the projection of the door leaves 30, 32 onto the perpendicular plane P3.

Thanks to the present disclosure, when the door 28 is in the closed configuration and in case of depressurization, the door 28 opens, under the pressure load generated by the depressurization, enough to let the air trapped within the enclosure 24 of the first piece of equipment 20 escape while encroaching as less as possible on the aisle 36.

In particular, the locking system 40 of the first piece of equipment 20, especially the articulation mechanism 62, makes it possible for the door 28 to move from the closed configuration into the emergency configuration in case of depressurization.

This makes it possible to allow balancing of the pressure between the inside and the outside of the enclosure 24 while allowing the passengers to efficiently egress the cabin 14 by walking down the aisle 36 past the first piece of equipment 20.

What is claimed is:

1. An aircraft portion of an aircraft comprising:
a fuselage delimiting an aircraft cabin;
a piece of equipment delimiting with another piece of equipment or with a wall of the aircraft portion an aisle extending along an aisle axis, the aisle having a width measured according to a transversal axis substantially perpendicular to the aisle axis, the piece of equipment comprising:
an outer wall delimiting an enclosure;
a door facing the aisle and comprising at least a first leaf and at least a second leaf, each of the at least one first leaf and at least one second leaf being rotatably mounted onto the outer wall respectively along a first axis of rotation and a second axis of rotation, the door being displaceable between:
a closed configuration in which the at least one first leaf and the at least one second leaf prevent access to the enclosure by extending both in a plane substantially parallel to the aisle axis and to a vertical axis substantially perpendicular to the aisle axis and to the transversal axis;
an open configuration in which the at least one first leaf and the at least one second leaf extend at least partially into the aisle to give access to the enclosure;
wherein, by the door, the aisle has:
a maximum width when the door is in the closed configuration;
a minimum width when the door is in the open configuration; and
wherein, when the door is in the closed configuration and in case of depressurization, the door is displaced and kept into an emergency configuration which is between the closed configuration and the open configuration, wherein by the door, the aisle has an optimum width which is between the maximum width and the minimum width and which corresponds to a width sufficient for simultaneously:
  letting air escape from the enclosure; and
  enabling passengers to walk down the aisle past the piece of equipment.

2. The aircraft portion according to claim 1, wherein:
the minimum width of the aisle by the door is between 4 inches and 8 inches;
the optimum width of the aisle by the door is between 15 inches and 25 inches.

3. The aircraft portion according to claim 1, wherein:
in the open configuration of the door, each of the at least one first leaf and at least one second leaf forms an angle between 75° and 100° with the aisle axis;
in the emergency configuration of the door, each of the at least one first leaf and at least one second leaf forms an angle between 5° and 15° with the aisle axis.

4. The aircraft portion according to claim 1, wherein the aircraft cabin extends along a longitudinal axis of the aircraft, the piece of equipment being arranged into a lateral part of the aircraft cabin, the aisle axis being substantially parallel to the longitudinal axis of the aircraft.

5. The aircraft portion according to claim 1, wherein the piece of equipment is an aircraft lavatory.

6. The aircraft portion according to claim 1, wherein the piece of equipment delimits the aisle with a partition wall of the aircraft portion, the partition wall extending substantially perpendicular to the aisle axis in a perpendicular plane, the partition wall of the aircraft portion comprising an edge delimiting the aisle with the piece of equipment,
  wherein the first axis of rotation of the first leaf or the second axis of rotation of the second leaf extends into the perpendicular plane,
  wherein the aisle has a passageway span being a minimum distance between:
    the edge of the partition wall; and
    the at least one first leaf or the at least one second leaf;
  the passageway span being:
    between 4 inches and 8 inches in the open configuration of the door;
    between 18 inches and 22 inches in the emergency configuration of the door.

7. The aircraft portion according to claim 1, wherein the piece of equipment further comprises a locking system comprising a door striker mounted onto the at least one first leaf and a dead bolt mounted onto the at least one second leaf,
  wherein the dead bolt is movable in translation along a lock axis, which is substantially parallel to the aisle axis when the door is in the closed configuration, between:
    a locking position wherein, when the door is in the closed configuration, the dead bolt cooperates with the door striker to keep the door in the closed configuration;
    an unlocking position wherein, when the door is in the closed configuration, the dead bolt is away from the door striker so as to enable a displacement of the door from the closed configuration to the open configuration;
  the dead bolt comprising:
    a first portion designed to extend within the door striker in the locking position;
    a second portion mounted onto the at least one second leaf; and
    an articulation mechanism connecting the first portion and the second portion of the dead bolt and extending between the at least one first leaf and the at least one second leaf when the door is in the closed configuration, the articulation mechanism comprising a joint enabling movement of the first portion relative to the second portion along a rotation axis substantially parallel to the vertical axis;
  wherein, when the door is in the closed configuration, when the dead bolt is in the locking position and in case of depressurization, the door is displaced into the emergency configuration by rotation of the first portion of the dead bolt relative to the second portion of the dead bolt around the rotation axis of the joint.

8. The aircraft portion according to claim 7, wherein the joint is a pin joint comprising a pin extending substantially parallel to the vertical axis.

9. The aircraft portion according to claim 7, wherein the articulation mechanism further comprises a stop and a complementary stop designed to cooperate to limit the rotation of the first portion of the dead bolt relative to the second portion of the dead bolt via the joint to a maximum rotation in which the door is in the emergency configuration.

10. The aircraft portion according to claim 7, wherein the door striker comprises a housing designed to receive the first portion of the dead bolt in the locking position, the dead bolt comprising at least one bearing designed to cooperate with inner walls of the housing during the displacement of the dead bolt between the locking and unlocking positions to guide the movement of the dead bolt.

11. The aircraft portion according to claim 10, wherein the at least one bearing is a ball bearing.

12. The aircraft portion according to claim 10, wherein the dead bolt comprises at least two bearings arranged next to one another along the lock axis.

13. The aircraft portion according to claim 7, wherein the articulation mechanism further comprises a mechanical fuse designed to:
  prevent rotation of the first portion of dead bolt relative to the second portion of dead bolt via the joint under normal conditions of flight;
  break in case of depressurization, the breaking of the mechanical fuse enabling rotation of the first portion of dead bolt relative to the second portion of dead bolt via the joint.

14. The aircraft portion according to claim 13, wherein in case of depressurization, the mechanical fuse is designed to break under a pressure load which is higher than or equal to a load threshold,
  wherein the load threshold is lower than or equal to the load generated by the depressurization onto the door, and
  wherein the mechanical fuse is designed to remain whole under loads that are lower than the load threshold.

15. The aircraft portion according to claim 14, wherein the load threshold is between 550 N and 750 N.

16. The aircraft portion according to claim 14, wherein the mechanical fuse is a fuse pin extending substantially parallel to the rotation axis of the joint, and wherein in case of depressurization, the fuse pin breaks under shear stress.

17. The aircraft portion according to claim 16, wherein a shear stress threshold corresponding to the load threshold is between 250 MPa and 500 MPa.

18. The aircraft portion according to claim 16, wherein the fuse pin and the joint are separated in a plane substantially perpendicular to the rotation axis of the joint, by a distance between 10 mm and 15 mm.

19. The aircraft portion according to claim 16, wherein the fuse pin is made up of an aluminum alloy, and wherein the fuse pin has a diameter between 0.125 inch and 0.5 inch.

20. An aircraft comprising an aircraft portion according to claim 1.

* * * * *